United States Patent
Fiore et al.

(10) Patent No.: US 7,126,533 B2
(45) Date of Patent: Oct. 24, 2006

(54) DIRECTION-FINDING FOR MULTIPLE COCHANNEL SOURCES

(75) Inventors: Paul D Fiore, Chelmsford, MA (US); Steven F Kimball, Auburn, NH (US)

(73) Assignee: Bae Systems Information and Electronic Systems Integration Inc, Nashua, NH (US)

( * ) Notice: Subject to any disclaimer, the term of this patent is extended or adjusted under 35 U.S.C. 154(b) by 0 days.

(21) Appl. No.: 10/497,556

(22) PCT Filed: Jul. 1, 2003

(86) PCT No.: PCT/US03/20679

§ 371 (c)(1),
(2), (4) Date: Dec. 21, 2004

(87) PCT Pub. No.: WO2004/097449

PCT Pub. Date: Nov. 11, 2004

(65) Prior Publication Data

US 2005/0212703 A1    Sep. 29, 2005

Related U.S. Application Data

(60) Provisional application No. 60/458,006, filed on Mar. 27, 2003.

(51) Int. Cl.
*G01S 3/16* (2006.01)
*G01S 5/02* (2006.01)

(52) U.S. Cl. .................. 342/383; 342/417; 342/451

(58) Field of Classification Search ............... 342/368, 342/382–383, 417, 423, 433–436, 451; 367/124; 381/92; 702/191, 194, 196; 708/322
See application file for complete search history.

(56) References Cited

U.S. PATENT DOCUMENTS

| | | |
|---|---|---|
| 4,992,796 A | 2/1991 | Apostolos |
| 5,426,438 A | 6/1995 | Peavey et al. |
| 6,018,317 A | 1/2000 | Dogan et al. |

OTHER PUBLICATIONS

See, Chong-Meng Samson, "A Single Channel Approach to High Resolution Direction Finding and Beamforming", IEEE, 2003, pp. V-217-V-220.
See, Chong-Meng Samson, "High Resolution DF With A Single Channel Receiver", IEEE, 2001, pp. 520-523.

(Continued)

*Primary Examiner*—Thomas H. Tarcza
*Assistant Examiner*—Fred H. Mull
(74) *Attorney, Agent, or Firm*—Maine & Asmus

(57) ABSTRACT

Techniques for determining the angles of arrival of multiple simultaneous cochannel sources using only a single RF receiver sampling and downconversion channel is disclosed. This is accomplished by sequentially forming several known mixtures of multiple antenna signals in the RF domain prior to downconversion and digitization. Angle of arrival information is then recovered through the application of higher order statistics and subspace fitting techniques. The same principles can be applied to other P-element receiver arrays (e.g., acoustical receiver array).

26 Claims, 2 Drawing Sheets

OTHER PUBLICATIONS

Mendel, Jerry M., "Tutorial on Higher-Order Statistics (Spectra) in Signal Processing and System Theory: Theoretical Results and Some Applications", IEEE, Mar. 3, 1991, pp. 278-305, vol. 79, No. 3.

Nikias, Chrysostomos L. et al., "Signal Processing with Higher-Order Spectra", IEEE Signal Processing Magazine, Jul. 1993, pp. 10-37.

Martone, M., "On MMSE Real-Time Antenna Array Processing Using Fourth-Order Statistics in the US Cellular TDMA System", IEEE, Oct. 8, 1998, pp. 1396-1410, vol. 16, No. 8.

Yao, Minli et al. "Direction Finding For Multiuser Correlated Signals Based on Spatial Signature Estimation in Cyclic Cumulant Domain", IEEE, 1999, pp. IV-443-IV-446.

PCT Search Report dated Mar. 9, 2004 of Patent Application No. PCT/US03/20679 filed Jul. 1, 2003.

DIRECTION-FINDING FOR MULTIPLE COCHANNEL SOURCES

This application is a National Stage of International Application No. PCT/US2003/20679, filed Jul. 1, 2003, which claims the benefit of U.S. Provisional Application No. 60/458,006, filed Mar. 27, 2003. Each of these applications is herein incorporated in its entirety by reference.

FIELD OF THE INVENTION

The present invention relates to direction-finding, and more particularly, to techniques for determining the angles of arrival of multiple simultaneous radio frequency cochannel signals.

BACKGROUND OF THE INVENTION

Radio direction-finding (DF) or determining the angles of arrival (AOA) of multiple simultaneous radio frequency (RF) cochannel signals in an inexpensive manner is a capability that is currently not found in existing implementations. In an RF environment, cochannel signals are two or more signals transmitted on the same carrier frequency at the same time. Generally, conventional direction-finding approaches fall into two broad categories.

The first category includes expensive, highly capable systems, which can locate multiple sources, but which require multiple phase coherent downconversion and sampling channels. Examples of these approaches include subspace based methods such as the MUSIC (multiple signal classification) algorithm, which capitalizes on the linear independence among multiple signals from different directions, thereby providing totally robust performance in complex signal environments. Another such example is a computed-interferometry radar system with coherent integration, as discussed in U.S. Pat. No. 4,992,796, which is herein incorporated by reference in its entirety.

The second category includes relatively inexpensive, single channel systems. With these approaches, multiple antennas are sampled at a high rate in a commutated fashion, and the induced phase changes gives an indication of the AOA. However, systems of this type can only locate a single source and cannot operate in the presence of cochannel interference or jamming.

What is needed, therefore, are techniques for cost effective radio direction-finding for environments with cochannel signals.

BRIEF SUMMARY OF THE INVENTION

One embodiment of the present invention provides a method for determining the angles of arrival of multiple simultaneous cochannel signals received at a P-element receiver array (e.g., such as an RF or acoustic array). The method includes receiving multiple simultaneous cochannel (e.g., RF or acoustic) signals at the array, sequentially forming mixtures of the received cochannel signals using mixture weights, and forming data cumulants based on the formed mixtures. The method further includes searching over appropriate degrees of freedom in a mixture manifold including a set of possible cumulants associated with the array to establish a best fit between the formed data cumulants and the possible data cumulants, thereby determining angle of arrival (AOA) estimates for each of the received cochannel signals.

In one such embodiment, searching over appropriate degrees of freedom in a mixture manifold includes limiting the search region. In another such embodiment, previous angle of arrival estimates can be used to initialize a next search, thus saving computational cost in the searching. Here, the search range can be reduced by allowing the searching to be performed only within a small angular window of last estimated positions. In another such an embodiment, searching over appropriate degrees of freedom in a mixture manifold includes an alternating least squares (ALS) iterative optimization process. Next, however, that any general purpose optimization process can be employed here.

Note that in an RF application, where multiple simultaneous RF cochannel signals are received at a P-element antenna array, and mixtures of the received RF cochannel signals are formed using RF mixture weights, the method may further include forming data cumulants based on the formed mixtures. The method may further include forming a downconverted baseband mixture for each RF mixture using single channel downconversion. In such an application, the forming of data cumulants is based on the baseband mixtures.

The method may further include the preliminary step of determining the mixture manifold and appropriate degrees of freedom for searching based on calibrated antenna gains and phases associated with the array, and the baseband mixture weights. To this end, the method may further include determining the calibrated antenna gains and phases at desired operating frequencies associated with the array, and determining the RF mixture weights and associated baseband mixture weights for all desired mixtures of the RF cochannel signals.

Another embodiment of the present invention provides a system for determining the angles of arrival of multiple simultaneous cochannel signals received at a P-element receiver array (e.g., such as an RF or acoustic array). The system includes two or more elements (e.g., antenna or microphone) adapted to receive multiple simultaneous cochannel signals (simultaneous RF or acoustic cochannel signals). A mixture forming section is adapted to sequentially form mixtures of the received cochannel signals using mixture weights, and a form cumulants module is adapted to form data cumulants based on the formed mixtures. A subspace fitting search module is adapted to search over appropriate degrees of freedom in a mixture manifold including a set of possible cumulants associated with the array to establish a best fit between the formed data cumulants and the possible data cumulants, thereby determining angle of arrival (AOA) estimates for each of the received cochannel signals.

In one such embodiment, the subspace fitting search module is adapted to establish an optimal estimated mixture matrix ($A_{est}$), where $$A_{est} = \arg\max_{A \in \mathcal{A}} \sum_{q=1}^{Q} w_q \frac{(c_y^q)^T P_A^q c_y^q}{(c_y^q)^T c_y^q}.$$

Here, $\mathcal{A}$ is the mixture manifold representing the set of possible mixture matrices, $c_y^q$ represents the formed data cumulants, with q representing a particular data cumulant, $P_A^q$ represents a matrix that projects onto the subspace spanned by $\Theta^q A$, where $P_A^q = (\Theta^q A)\{(\Theta^q A)^T (\Theta^q A)\}^+ (\Theta^q A)^T$, and $w_q$ are nonnegative weights. The searching performed by the subspace fitting search module may include, for example, an alternating least squares (ALS) iterative optimization process, or a general purpose optimization process.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION OF THE INVENTION

Figure 1:
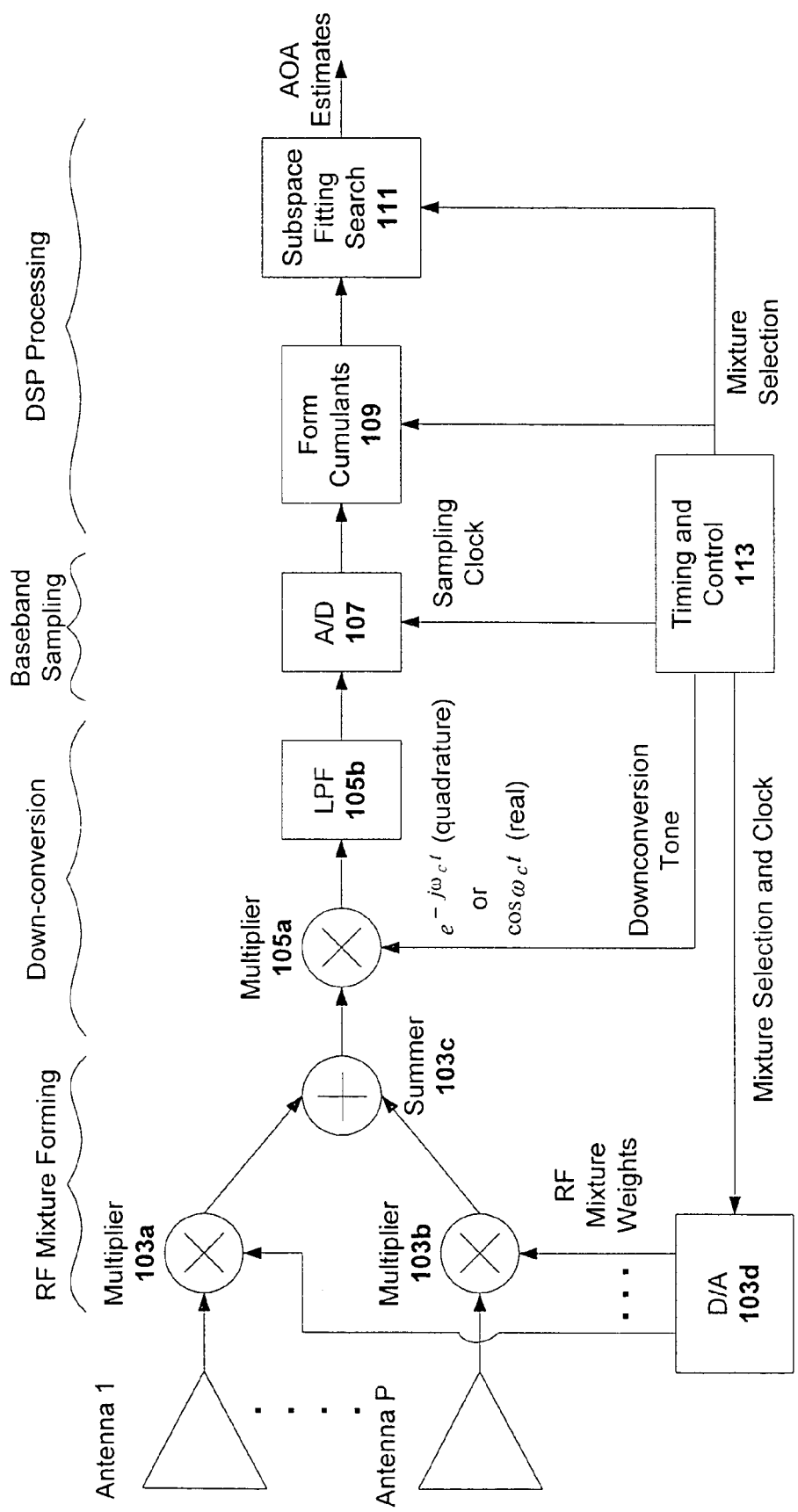
FIG. 1 is a block diagram illustrating a radio frequency direction-finding receiver configured for determining the angles of arrival of multiple simultaneous radio frequency cochannel signals received at a P-element antenna array in accordance with one embodiment of the present invention.

Embodiments of the present invention combine analog and digital signal processing to provide a cost effective alternative to prior radio frequency direction-finding approaches, by reducing the amount of downconversion hardware, and eliminating the requirement for phase coherent sampling, while at the same time allowing for several cochannel simultaneously transmitting sources. A number of identified conditions are exploited to achieve this result. In particular, it has been recognized that multiple source AOAs are encoded in the analog mixtures in a way that does not depend on simultaneity of sampling. Further, this information can be extracted through well-established higher order statistical approaches and general purpose multiple parameter function optimization techniques.

More specifically, a set of simultaneous non-linear equations that are functions of the mixtures are approximately solved, using any general purpose optimization methods. This technique differs from existing subspace methods and more recent blind source separation (BSS) techniques in that, due to the nonlinear nature of the formulation and solution, beneficial properties are provided that are lacking in subspace and BSS methods. For instance, embodiments of the present invention provide the ability to resolve the direction of arrival of multiple RF sources on an array while measuring only one array element or mixture of elements at a time. This ability allows the creation of relatively simple and low cost RF DF systems. Applications other than RF DF will be apparent in light of this disclosure (such as acoustic DF applications).

Before describing the architecture of the present invention, a discussion on notation and mathematics used herein is provided for purposes of clarity, as well as the derivation of a cumulant approach employed in accordance with the principles of the present invention.

Notation and Mathematical Background

In this disclosure, scalars are represented by non-bold letters, vectors are represented by boldface lower-case letters (e.g., v), the $i^{th}$ element of a vector v by $[v]_i$ or $v_i$, matrices are represented by boldface upper-case letters (e.g., A), and the $(i,j)^{th}$ element of a matrix A by either $[A]_{i,j}$ or $a_{i,j}$. Key properties and functions of matrices and subspaces which are used herein, such as pseudoinverses and projectors, are conventional.

The relevant background material on higher order statistics that will be needed to understand the techniques described herein, including properties of moments and cumulants, is now summarized. Given a set of N real random variables $x_1, \ldots, x_N$ their joint moments of order $r = k_1 + \ldots + k_N$ are given by:

$$mom(x_1^{k_1}, x_2^{k_2}, \ldots, x_N^{k_N}) = E\{x_1^{k_1} x_2^{k_2} \ldots x_N^{k_N}\}, \quad \text{(Equation 1)}$$

where $E\{\bullet\}$ is the statistical expectation operator.

Cumulants and moments are related by well known algebraic formulas. For example, letting $m_i = mom(x_1^i)$, $c_i = cum(x_1^i)$, the following cumulants are provided:

$$c_1 = m_1,$$
$$c_2 = m_2 - m_1^2,$$
$$c_3 = m_3 - 3m_2 m_1 + 2m_1^3,$$
$$c_4 = m_4 - 4m_3 m_1 - 3m_2^2 + 12 m_2 m_1^2 - 6m_1^4,$$
$$\vdots$$

(Equations 2)

Thus, one way of forming cumulants of data is to first calculate the moments and then apply Equations 2.

Note the following properties associated with moments and cumulants. If $a_1, \ldots, a_N$ are constants, then:

$$mom(a_1 x_1, \ldots, a_N x_N) = a_1 \ldots a_N mom(x_1, \ldots x_N) \quad \text{(Equation 3)}$$

and $$cum(a_1 x_1, \ldots, a_N x_N) = a_1 \ldots a_N cum(x_1, \ldots x_N) \quad \text{(Equation 4)}$$

In addition, moments and cumulants are symmetric functions. For example, $mom(x_1, x_2, x_3) = mom(x_2, x_3, x_1)$.

Also, if the random variables $x_1, \ldots x_N$ can be divided into two groups that are statistically independent, any cumulant containing members from each group is identically zero (whereas this is usually not true for moments). For example if $x_1$ is statistically independent from $x_2$ and $x_3$, then cum $(x_1, x_2, x_3) = 0$. Further, if the sets of random variables $x_1, \ldots, x_N$ and $y_1, \ldots, y_N$ are statistically independent, then:

$$cum(x_1+y_1, \ldots, x_N+y_N) = cum(x_1, \ldots, x_N) + cum(y_1, \ldots, y_N), \quad \text{(Equation 5)}$$

whereas this property does not generally hold for moments.

The componentwise exponentiation operator, $\Theta^q$, which is defined for a generic matrix B as producing the matrix with elements:

$$[\Theta^q B]_{i,j} = [B]_{i,j}^q. \quad \text{(Equation 6)}$$

Derivation of the Cumulant Fitting Approach

For the purposes of this disclosure, a two-dimensional (planar) world is assumed, and the extension of the techniques presented herein to three-dimensional geometries will be apparent in light of this disclosure. The array response $r(\psi, \theta)$ is the gain of the receiver's antenna or array as a function of the AOA $\theta$ when the array is steered to direction $\psi$. The simplest situation is when: $r(\psi, \theta)$ is completely known (i.e., the array is calibrated) and, $r(\psi,\theta)$ depends only on the angular difference between the AOA and the steering direction (i.e., $r(\psi,\theta) \equiv r(\psi-\theta)$). An algorithm has been developed for use when both of the above conditions hold, as well as the more difficult scenarios when only one of the above conditions hold.

When N sources impinge upon the array from AOAs $\theta_1, \ldots, \theta_N$ (which are collected into a vector $\theta=[\theta_1, \ldots, \theta_N]^T$) their signals are weighted by the array response and then added together. That is, at each discrete time t, the output y(t) from the array is:

$$y(t) = \sum_{n=1}^{N} r(\psi(t), \theta_n) x_n(t) \quad \text{(Equation 7)}$$

where $\psi(t)$ is the steering direction at time t, and $x_n(t)$ is the effective signal at the array from source n at time t.

Assume that steering directions are chosen from a small set of discrete directions, for example, $\psi_m = 2\pi(m-1)/M$ for $m=1, \ldots, M$. The M by N matrix A formed from $r(\psi_m, \theta_n)$ for a set of possible combinations $\psi_m$ and $\theta_n$ via:

$$A = \begin{bmatrix} r(\psi_1, \theta_1) & \cdots & r(\psi_1, \theta_N) \\ \vdots & & \vdots \\ r(\psi_M, \theta_1) & \cdots & r(\psi_M, \theta_N) \end{bmatrix} \quad \text{(Equation 8)}$$

is termed the "mixture matrix", and the entire set of possible A matrices is termed the "mixture manifold" and is denoted by $\mathcal{A}$. How data formed from cumulants of mixtures of received signals relates to A is now discussed.

Assume that the N sources that impinge on a sensor array are statistically independent, and K samples for each of M mixtures are collected. In the following development, the sources are indexed by $n=1, \ldots, N$, the mixtures by $m=1, \ldots, M$, and the samples by $k=1, \ldots, K$, and the cumulant orders by $q=1, \ldots, Q$, where Q is some maximum order (typically, $Q=6$ or $Q=8$).

The $n^{th}$ source produces samples $x_{m,k,n}$, all drawn from the same probability density function (PDF) $p_n(x)$. The $q^{th}$-order cumulant of the source n PDF is denoted by $c_{n,q}$, and $c_x^q = [c_{1,q}, \ldots, c_{N,q}]^T$. For convenience, the $k^{th}$ combined vector of sources for mixture m is defined as $x_{m,k} = [x_{m,k,1}, \ldots, x_{m,k,N}]^T$ and also the N by K matrices $X_m$ with $[X_m]_{n,k} = x_{m,k,n}$.

Let $y_{m,k}$ represent the $k^{th}$ sample of the $m^{th}$ mixture, and for convenience, define the vectors $y_m = [y_{m,1}, \ldots y_{m,K}]^T$. The empirical $q^{th}$-order cumulant of the $m^{th}$ mixture is denoted by $c_{y,m}^q$ and is calculated from the data $y_m$. The empirical vector of $q^{th}$-order cumulants for the M measured mixtures is denoted by $c_y^q = [c_{y,1}^q, \ldots, c_{y,M}^q]^T$.

Further, let $a_{m,n}$ represent the mixture weight in the $m^{th}$ mixture for the $n^{th}$ source, and collect these mixture weights into the M by N matrix A (defined in Equation 8) such that $[A]_{m,n} = a_{m,n}$. For convenience, define the vectors $a_m = [a_{m,1}, \ldots a_{m,N}]^T$. When there is no observation noise, the $m^{th}$ mixture is formed as:

$$y_m^T = a_m^T X_m. \quad \text{(Equation 9)}$$

The theoretical $q^{th}$-order cumulant of a single mixture output sample $y_{m,k}$ ($cum(y_{m,k} \ldots y_{m,k})$) is therefore:

$$= cum(a_m^T x_{m,k}, \ldots, a_m^T x_{m,k}) \quad \text{(Equation 10)}$$

$$= \sum_{n=1}^{N} cum(a_{m,n} x_{m,n,k}, \ldots, a_{m,n} x_{m,n,k})$$

$$= \sum_{n=1}^{N} a_{m,n}^q cum(x_{m,n,k}, \ldots, x_{m,n,k})$$

$$= \sum_{n=1}^{N} a_{m,n}^q c_{n,q}$$

$$= (\Theta^q a_m^T) c_x^q$$

where properties of Equations 4 and 5 have been used. Stacking Equation 10 for all mixtures gives:

$$c_y^q = (\Theta^q A) c_x^q \quad \text{(Equation 11)}$$

for all cumulant orders q.

Thus, Equation 11 enables the formulation of an equation error fitting approach to determine the AOAs, and if desired, the mixture matrix A and the cumulants $c_x^q$. By varying the estimated AOAs $\theta$, the estimated $\Theta^q A$ is varied, so that their range subspaces are also varied. When the ranges of the $\Theta^q A$ include the empirical cumulants $c_y^q$, the best estimated $\theta$ is provided.

The above was formulated assuming that there was no noise and perfect cumulants. In reality, the fitting of the empirical cumulants to the range subspace will not be perfect. Thus, seeking to optimize an approximate criterion is a desirable option. For example, the AOAs $\theta$ that minimize the total relative fitting error of Equation 11 can be sought as:

$$A_{est} = \arg\min_{A \in \mathcal{A}} J(A), \quad \text{(Equation 12)}$$

where J(A) is the fitting error cost function given by:

$$J(A) = \sum_{q=1}^{Q} w_q \frac{\|c_y^q - P_A^q c_y^q\|^2}{\|c_y^q\|^2}, \quad \text{(Equation 13)}$$

where $P_A^q$ is the matrix that projects onto the subspace spanned by $\Theta^q A$, and is provided by:

$$P_A^q = (\Theta^q A)\{(\Theta^q A)^T(\Theta^q A)\}^+(\Theta^q A)^T, \quad \text{(Equation 14)}$$

$w = [w_1 \ldots w_Q]^T$ is a vector of nonnegative weights, and "$\{\ \}^+$" is the pseudoinverse operation. Note that linear algebra gives the equivalent optimization criteria:

$$A_{est} = \arg\max_{A \in \mathcal{A}} \sum_{q=1}^{Q} w_q \frac{(c_y^q)^T P_A^q c_y^q}{(c_y^q)^T c_y^q} \quad \text{(Equation 15)}$$

The weights w should be chosen according to the relative importance of the various terms. For example, for PDFs that are zero mean, the $q=1$ cumulants for both x and y are ideally zero. The weight $w_1$ should be set to zero in this case.

Similarly, for Gaussian sources, $w_q=0$ for $q>2$. Finally, for PDFs are symmetric about zero, $w_q$ should be set to zero for all odd q.

To perform the optimization illustrated in Equation 15, a general purpose optimization can be performed over the appropriate DOFs in the model. Two different cases are now examined which make varying assumptions about which parameters are known.

In a first case, $r(\psi,\theta)$ is completely known and is not required to be steering direction invariant (e.g., such as a conventional stationary electronically steerable array). Here, the mixture manifold $\mathcal{A}$ is parameterized by the N AOAs $\theta_n$. A search over the $\theta_n$ will yield the best match of $A \epsilon \mathcal{A}$ and thus optimize Equation 15.

In a second case, $r(\psi,\theta)$ is completely unknown and steering direction invariant (e.g., such as a spinning array). Because the response is steering direction invariant, the columns of A are circularly rotated (and interpolated) versions of each other, and the rotation amount is an indicator of relative AOA between the sources. In addition to the N–1 AOA differences $\theta_1-\theta_n$, $\mathcal{A}$ is parameterized by the M parameters $r(\psi_1,\theta_1), \ldots r(\psi_M,\theta_1)$, but with the additional constraint that the columns of A be unit-norm. This additional constraint is required because there is a scale ambiguity between A and the sources. Thus, there are N+M–2 DOF in $\mathcal{A}$. Therefore, a search over the N+M–2 DOF is performed to optimize Equation 15, reconstruct the estimated A, and circularly convolve each column with the first column to obtain the differences in AOA between sources, $\theta_1-\theta_n$. For many situations, this is adequate (e.g., adaptive interference cancellation). If absolute AOA are required, then some other form of information must be provided to resolve the remaining one DOF and thus globally orient the sources.

Alternative Direction-Finding Techniques

There are various alternatives to the direction-finding method described herein that may be used to improve performance in different situations. For example, it can be beneficial to augment some of the $\Theta^q A$ with an additional column of all ones, and then form the projection matrix $P_A^q$ from the augmented matrix. This alternative embodiment allows for modeling errors and the finite sample effects in the cumulant formation.

Another embodiment considers that general purpose optimization routines usually require multiple starting points for searches to be supplied by the user. In the absence of any knowledge of where the true optima is located, many random starting points are generally tried. Because of the symmetry inherent in the direction-finding equations, the search region can be limited to $0 \leq \theta_1 < \ldots < \theta_N < 2\pi$.

In a tracking situation, where the sources are assumed to be slowly moving, the AOAs estimated from earlier data can be used to initialize the next search, thus saving computational cost in performing the search. Additionally, the search range can be reduced by only allowing the search to be performed within some small angular window of the last estimated positions.

If enough data is available, note that the reciprocal of the cost criteria of Equation 15 has an interesting structure. In particular, it has ridges perpendicular to the coordinate axes. This form of cost structure is efficiently solved by a technique known as "alternating least squares" (ALS). In this iterative method, only one source direction estimate is altered at a time, while holding the other estimated directions fixed. The best cost along this line is found, the current estimated $\theta$ is updated, and the procedure is then repeated with a different component. Thus, another useful variation is to replace the general purpose optimization approach with an ALS optimization approach.

Once the optimal $A_{est}$ is obtained, the source cumulants $c_x^q$ can readily be obtained by solving Equation 11 using either ordinary least squares (OLS) or total least squares (TLS). These cumulants may be used as features for source type identification.

As formulated, the number of sources N must be known or guessed. One method to do this is to sequentially guess $N_{guess}=1,2,3,\ldots$, perform the previously described algorithm (as represented in Equation 15), and look for a large reduction in the estimated power (i.e., the q=2 cumulant) of the weakest signal relative to the other signals. When the weakest source power drops below a detection threshold, $N=N_{guess}-1$ is selected as the estimated number of sources.

Application of Cumulant Fitting Approach to RF DF Systems

The previous section provides a detailed derivation of a baseband method to determine AOA from nonsimultaneously sampled mixtures. It will now be shown with reference to FIG. 1 how this technique can be employed in a real RF DF system, by deriving the baseband mixture weights (and hence A) as a function of mixtures applied at RF.

FIG. 1 is a block diagram illustrating a RF DF receiver configured in accordance with one embodiment of the present invention. The receiver includes an array of antennas (1, . . . , P), an RF mixture forming section (multiplier modules 103a–b, summer module 103c, and digital-to-analog (D/A) converter 103d), a downconversion section (multiplier 105a and low pass filter 105b), a baseband sampling section (analog-to-digital (A/D) converter 107), a digital signal processing (DSP) section (form cumulants module 109 and a subspace fitting search module 111), and a timing and control module 113. The receiver is adapted to receive multiple cochannel sources, and to provide AOA estimates of those signals.

On the transmitter side (not shown), an emitter transmits a complex narrowband signal x(t) after complex upconversion to a frequency $\omega_c$ by sending:

$$u(t) = Re(x(t)e^{j\omega_c t}) \quad \text{(Equation 16)}$$

across the radio channel.

At the receive P-element antenna array of FIG. 1, the vector of received signals for a single mixture is:

$$z(t) = \begin{bmatrix} Re(h_1 e^{j\rho_1} x(t))e^{j\omega_c t} \\ \vdots \\ Re(h_P e^{j\rho_P} x(t))e^{j\omega_c t} \end{bmatrix} \quad \text{(Equation 17)}$$

where $h_p e^{j\rho_p}$ is the gain and phase of the $p^{th}$ antenna for the current angle of arrival and carrier frequency. These gains and phases are typically determined by a calibration operation wherein a narrowband source at a known frequency is sequentially placed at many different AOAs, and the gains and relative phases are then observed. Thus, assume then that this calibration operation is carried out using conventional techniques, and that the results are available to the algorithm.

The common unknown phase shift representing the time delay of the local oscillator has been absorbed into x(t). If the local oscillators of the source and receivers are stable, then this unknown phase term is constant for revisits to a given mixture. For example, a QPSK constellation might be rotated by the constant phase term. If either the source or received oscillator is not very stable, then the true source is smeared in angle, creating a new, perceived source PDF. However, this smearing is irrelevant to the present invention, which only requires that over many mixtures the perceived source PDF does not change.

A mixture is formed at RF with the real mixture weights $m=[m_1, \ldots m_P]^T$ via:

$$s(t) = m^T z(t) \quad \text{(Equation 18)}$$

$$= \sum_{p=1}^{P} m_p \text{Re}(h_p e^{j\rho_p} x(t) e^{j\omega_c t})$$

$$= \sum_{p=1}^{P} \text{Re}(m_p h_p e^{j\rho_p} x(t) e^{j\omega_c t}).$$

With reference to FIG. 1, each cochannel signal is received at all antennas. Each received signal is then weighted by operation of the multipliers 103a–b and the D/A converter 103d, which provides the RF mixture weights based on the desired mixture selection. The weighted signals are then summed by summer 103c to form a desired RF mixture.

Note that the mixture forming section can be implemented in a number of ways as will be apparent in light of this disclosure, and the present invention is not intended to be limited to any one such configuration. For example, alternative embodiments of the present invention may form mixtures using a programmable resistor network, where each receiving element is communicatively coupled to the network of resistors, and resistor values are set to provide the desired mixtures.

Quadrature Downconversion

For a quadrature downconversion path, the Hilbert transform is formed, which amounts to removing the Re(·) from Equation 18. The transform is then multiplied (by multiplier 105a) by $e^{-j\omega_c t}$, and low pass filtered (by LPF 105b) for band selection, resulting in:

$$y(t) = \sum_{p=1}^{P} m_p h_p e^{j\rho_p} x(t) \quad \text{(Equation 19)}$$

For multiple sources at different AOAs, this equation can be generalized to $$y(t) = \sum_{n=1}^{N} \sum_{p=1}^{P} m_p h_{pn} e^{j\rho_{pn}} x_n(t) \quad \text{(Equation 20)}$$

$$= a^H x(t),$$

where $x(t)=[x_1(t), \ldots x_N(t)]^T$, $a=[a_1, \ldots a_N]^H$, and $$a_n = \sum_{p=1}^{P} m_p h_{pn} e^{j\rho_{pn}}. \quad \text{(Equation 21)}$$

Thus, for a quadrature downconversion path, sources at a given AOA experience a constant weighting derived from the antenna calibration data and the weighting applied by the designer at RF. This is a straightforward generalization of the model previously discussed, where A is now allowed to be complex. Note that the Hilbert transform function has been integrated into the downconversion path in the embodiment shown in FIG. 1.

Real Downconversion

Note that a complex quadrature downconversion is associated with an increase in hardware cost because of the complex number processing. Here, a less expensive real downconversion approach is discussed.

For a real downconversion path, the resulting signal after multiplication (by module 105a) by $\cos(\omega_c t)$ and low pass filtering (by module 105b) is simply the real part of Equation 20, or $$y(t) = a_r^T x_r(t) - a_i^T x_i(t) \quad \text{(Equation 22)}$$

where $a=a_r+ja_i$ and $x(t)=x_r(t)+jx_i(t)$ are the decompositions into real and imaginary components. When the mixtures are formed implicitly by spinning a fixed array, a single antenna (P=1) is provided, and the phase term $\rho_{1n}$ is regarded to be zero and $m_{1n}=1$. In this case $a_i=0$, and $y(t)=a_r^T x_r(t)$. This corresponds to the case of a steering direction invariant array response. Another case that readily reduces to the model described herein is when $x_i(t)=0$ (i.e., a purely real baseband signal, or double-sideband modulation).

When P>1, the more general formulation of Equation 22 can be used. If the true x were real signals, then $x_i=0$, and $y(t)=a_r^T x_r(t)$, and thus the real source assumption allows for a simplification in hardware. Fortunately, x may in fact be assumed real, as is now shown. For any band limited complex baseband signal x(t), there is a real signal $\tilde{x}(t)$ such that x(t) is a frequency shifted version of the Hilbert transform of $\tilde{x}(t)$. These signals are equivalent in the sense that they can produce exactly the same frequency spectra when upconverted and emitted by a transmitter. Thus, no receiver can differentiate between the two signals, so it can be assumed that a real signal was sent. The real $\tilde{x}(t)$ is recovered by tuning the receiver downconversion tone $\omega_r$ to the lower band edge of u(t) in Equation 16, rather than to the transmitter carrier frequency $\omega_c$.

Choosing Suitable RF Mixture Weights

The previous discussion expresses the baseband mixture weights a for a given mixture as a function of the RF mixture weights m, which have been left undefined. How to choose m so that the baseband mixture weights have desirable properties will now be discussed.

To describe the array responses, index the steering directions as $\psi_m = 2\pi(m-1)/M$, for $m=1, \ldots, M$. Further, assume a mixture a is desired, with its largest response in the steering directions $\psi_m$ that belong to some set of angles, $\mathcal{P}$, and its smallest response for steering directions $\psi_1$ that belong to another set of angles denoted by $\mathcal{S}$.

From Equation 21 and $y(t)=a_r^T x_r(t)$, it would seem that only the gain and cosine of the phase angle of the calibration pattern are of concern. However, the calibration phases $\rho_{pn}$ can only be reported up to a common phase angle. For instance, 90° could be added to each of the phases and still have a valid calibration. Thus, for robustness, a formulation that uses both the real and imaginary parts of Equation 21 is desirable. Linear algebra shows that a good approximate answer can be obtained by performing the maximization:

$$m_{approx} = \arg\max_{m} \frac{m^T\left(\sum_{m \in p} R_m^T R_m\right)m}{m^T\left(\sum_{l \in s} R_l^T R_l\right)m} \quad \text{(Equation 23)}$$

where $$R_i \begin{bmatrix} h_{1i}\cos(\rho_{1i}) & \ldots & h_{Pi}\cos(\rho_{Pi}) \\ h_{1i}\sin(\rho_{1i}) & \ldots & h_{Pi}\sin(\rho_{Pi}) \end{bmatrix} \quad \text{(Equation 24)}$$

The optimization illustrated by Equation 23 is an easily solved generalized eigenvalue problem. Thus, desired mixtures a can be efficiently approximated. In addition, steering direction invariant responses can be approximately achieved if desired. Other approaches that are desirable include the minimax solution to Equation 23.

Recall that direction-finding can be performed if A can be determined from the observed data. Again, assume that the N sources that impinge on a sensor array are statistically independent, and K samples for each of M mixtures are collected. In the following development, the sources are indexed by n=1, ..., N, the mixtures by m=1, ..., M, and the samples by k=1, ..., K, and the cumulant orders by q=1, ..., Q, where Q is some maximum order (typically, Q=6 or Q=8).

As previously explained, $y_{m,k}$ represents the $k^{th}$ sample of the $m^{th}$ mixture (provided by the A/D module 107 of the baseband sampling section). The empirical $q^{th}$-order cumulant (measured or otherwise observed) of the $m^{th}$ mixture is denoted by $c_{y,m}^q$ and is calculated (by module 109) from the data $y_m$. The empirical vector of $q^{th}$-order cumulants for the M measured mixtures is denoted by $c_y^q = [c_{y,1}^q, \ldots, c_{y,M}^q]^T$. The theoretical $q^{th}$-order cumulant of a single mixture output sample $y_{m,k}$ (cum($y_{m,k}, \ldots, y_{m,k}$)) is demonstrated in Equation 10, and for all cumulant orders q is demonstrated in Equation 11.

Recall that Equation 11 enables the formulation of an equation error fitting approach (carried out by the subspace fitting search module 111) to determine the AOAs, and if desired, the mixture matrix A and the cumulants $c_x^q$. By varying the estimated AOAs θ, the estimated $\Theta^q A$ is varied, so that their range subspaces are also varied. When the ranges of the $\Theta^q A$ include the empirical cumulants $c_y^q$, the best estimated θ is provided.

As previously explained, the fitting of the empirical cumulants to the range subspace is generally not perfect, given real world noise conditions and imperfect cumulants. Thus, module 111 can be further configured to optimize an approximate criterion. For example, module 111 can be programmed or otherwise configured to seek the AOAs θ that minimize the total relative fitting error of Equation 11 as demonstrated in Equations 12 through 15.

The optimization illustrated in Equation 15 can be performed over the appropriate DOFs in the mixture manifold, with varying assumptions about which parameters are known as previously discussed (e.g., where r(ψ,θ) is completely known and is not required to be steering direction invariant, or where r(ψ,θ) is completely unknown and steering direction invariant). Further, note that the alternative direction-finding techniques previously discussed for contending with estimation uncertainty due to noise and improving performance for particular situations can be equally applied here.

The timing and control module 113 provides mixture selection information to the form cumulants module 109 and the subspace fitting search module 111. Module 113 further provides the sampling clock to the A/D module 107, and the downconversion tone to the multiplier 105a. Module 113 further provides desired mixture selection information and synchronization (clock/local oscillator) to the D/A 103d.

The components of the receiver illustrated in FIG. 1 can be implemented in hardware, software, firmware, or some combination thereof. For example, antennas 1, . . . , P, multiplier modules 103a–b and 105a, summer module 103c, D/A 103d, and A/D 107 can be implemented in conventional hardware components (whether off the shelf or custom designed). The form cumulants module 109 and subspace fitting search module 111 can each be implemented as a set of instructions executing on a digital signal processor (or other suitable processing environment). The timing and control module 113 can be implanted as a microcontroller unit configured with a CPU, memory, I/O capability, and a number of processes adapted to carryout the control signaling (e.g., mixture selection) and ensure proper timing (e.g., sampling times). Variations will be apparent in light of this disclosure. For example, the A/D 107, the form cumulants module 109, the subspace fitting search module 111, and the timing and control module 113 can all be integrated into a single module having the functionality described herein.

Methodology

Figure 2:
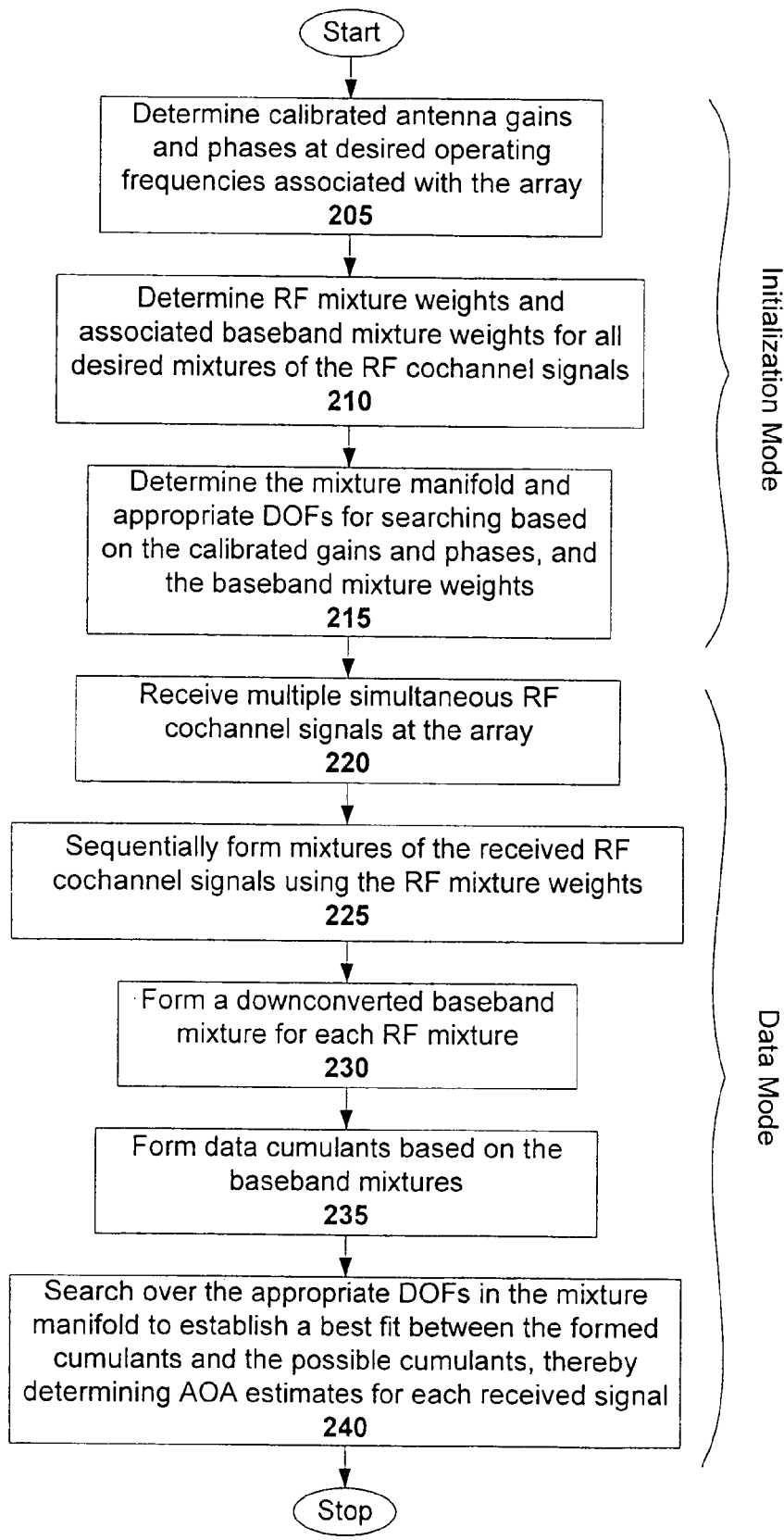
FIG. 2 is a flowchart illustrating a method for determining the angles of arrival of multiple simultaneous radio frequency cochannel signals received at a P-element antenna array in accordance with one embodiment of the present invention.

FIG. 2 is a flowchart illustrating a method for determining the angles of arrival of multiple simultaneous radio frequency cochannel signals received at a P-element antenna array in accordance with one embodiment of the present invention. The method can be carried out, for example, by the receiver illustrated in FIG. 1.

The method includes two modes of operation: an initialization mode and a data mode. The initialization mode can be performed prior to field usage or during normal link initialization procedures, while the data mode is performed during field usage or otherwise active transmissions by the sources.

The initialization mode includes determining 205 antenna gains and phases at desired operating frequencies associated with the array. These antenna gains and phases can be determined through a calibration process as previously explained. The method proceeds with determining 210 RF mixture weights and associated baseband mixture weights for all desired mixtures of the RF cochannel signals. In one embodiment, the RF mixture weights m are determined through a procedure represented by:

$$m_{approx} = \underset{m}{\text{argmax}} \frac{m^T\left(\sum_{m \in p} R_m^T R_m\right)m}{m^T\left(\sum_{i \in S} R_l^T R_l\right)m}, \text{ where}$$

$$R_i = \begin{bmatrix} h_{1i}\cos(\rho_{1i}) & \ldots & h_{Pi}\cos(\rho_{Pi}) \\ h_{1i}\sin(\rho_{1i}) & \ldots & h_{Pi}\sin(\rho_{Pi}) \end{bmatrix}.$$

The initialization mode method further includes determining 215 the mixture manifold and appropriate DOFs for searching based on the calibrated gains and phases, and the baseband mixture weights.

In data mode, the method includes receiving 220 multiple simultaneous RF cochannel signals at the array, and sequentially forming 225 mixtures of the received RF cochannel signals using the RF mixture weights. In one embodiment, sequentially forming mixtures of the received RF cochannel signals using RF mixture weights includes using analog multiplication and summing of the RF mixture weights prior to single channel downconversion and sampling (as shown in FIG. 1).

The method proceeds with forming 230 a downconverted baseband mixture for each RF mixture, and forming 235 data cumulants based on the baseband mixtures. In one embodiment, forming data cumulants based on the baseband mixtures includes first calculating data moments mathematically related to the data cumulants (e.g., such as shown in Equations 1 and 2). Note that forming data cumulants based on the baseband mixtures may further include allowing for modeling errors and finite sample effects as previously explained.

The method then proceeds with searching 240 over the appropriate DOFs in the mixture manifold to establish a best fit between the formed data cumulants and the possible data cumulants, thereby determining AOA estimates for each received signal. In one embodiment, the searching over appropriate degrees of freedom in the mixture manifold to establish a best fit between the formed data cumulants and the possible data cumulants includes establishing an optimal mixture matrix ($A_{est}$), where $$A_{est} = \arg\max_{A \in \mathcal{A}} \sum_{q=1}^{Q} w_q \frac{(c_y^q)^T P_A^q c_y^q}{(c_y^q)^T c_y^q}.$$

Recall that $\mathcal{A}$ is the mixture manifold, which indirectly represents a set of possible cumulants (and directly represents a set of possible mixture matrices), $c_y^q$ represents the formed data cumulants, with q representing a particular data cumulant, $P_A^q$ represents a matrix that projects onto the subspace spanned by $\Theta^q A$, where $P_A^q = (\Theta^q A)\{(\Theta^q A)^T(\Theta^q A)\}^+ (\Theta^q A)^T$, and $w_q$ are nonnegative weights.

In one particular case, the array response $r(\psi,\theta)$ is completely known and is not required to be steering direction ($\psi$) invariant, and the mixture manifold $\mathcal{A}$ is parameterized by N angles of arrival ($\theta_n$), and searching over the $\theta_n$ enables a best fit between formed data cumulants to possible data cumulants. Recall that N is the number of received multiple simultaneous RF cochannel signals, and n is index or one such specific signal.

In another case, the array response $r(\psi,\theta)$ is completely unknown and steering direction invariant, and in addition to N–1 AOA differences, the mixture manifold is parameterized by M parameters $r(\psi_1,\theta_1), \ldots, r(\psi_M,\theta_1)$, with an additional constraint that estimated mixture matrix columns be unit-norm. Here, searching over the resulting N+M–2 degrees of freedom is performed to optimize the estimated mixture matrix, thereby enabling a best fit between formed data cumulants to possible data cumulants. Recall that N represents the number of received multiple simultaneous RF cochannel signals, and M represents the number of formed RF mixtures.

Note that searching over appropriate degrees of freedom in a mixture manifold may include limiting the search region. Further note that previous angle of arrival estimates can be used to initialize a next search, thus saving computational cost in the searching. Here, the search range can be reduced by only allowing the searching to be performed within a small angular window of last estimated positions. In another particular embodiment, searching over appropriate degrees of freedom in a mixture manifold may include an alternating least squares (ALS) iterative optimization process as previously described. Alternatively, any general optimization method can be used here.

The method may include other steps as well, such as determining source cumulants ($c_x^q$), thereby enabling source type identification for each received RF cochannel signal (e.g., using either ordinary least squares (OLS) or total least squares (TLS) as previously explained). Alternatively, or in addition to, the method may include determining the number (N) of received RF cochannel signals based on estimated power of a weakest signal relative to the other signals as previously explained.

The foregoing description of the embodiments of the invention has been presented for the purposes of illustration and description. It is not intended to be exhaustive or to limit the invention to the precise form disclosed. Many modifications and variations are possible in light of this disclosure. For example, the present invention need not be limited to RF receivers. An P-element (e.g., P-microphone or other acoustic receiving element) acoustic receiver array could also employ the principles of the present invention as described herein. Note that in such an embodiment, there is no downconversion to baseband. Other variations (such as intermediate filtering and/or amplification) will be apparent. Generally, embodiments of the present invention can be exploited by any receiver array subjected to multiple cochannel sources. It is intended that the scope of the invention be limited not by this detailed description, but rather by the claims appended hereto.

What is claimed is:

1. A method for determining the angles of arrival of multiple simultaneous radio frequency (RF) cochannel signals received at a P-element antenna array, the method comprising:

receiving multiple simultaneous RF cochannel signals at the array;

sequentially forming mixtures of the received RF cochannel signals using RF mixture weights, thereby enabling nonsimultaneously sampled mixtures;

forming a downconverted baseband mixture for each RF mixture using single channel downconversion;

forming data cumulants based on the baseband mixtures; and searching over appropriate degrees of freedom in a mixture manifold including a set of possible data cumulants associated with the array to establish a best fit between the formed data cumulants and the possible data cumulants, thereby determining angle of arrival (AOA) estimates for each of the received cochannel signals.

2. The method of claim 1 further comprising the preliminary step of:

determining the mixture manifold and appropriate degrees of freedom for searching based on calibrated antenna gains and phases associated with the array, and baseband mixture weights associated with the RF mixture weights.

3. The method of claim 2 further comprising the preliminary steps of:

determining the calibrated antenna gains and phases at desired operating frequencies associated with the array; and determining the RF mixture weights and associated baseband mixture weights for all desired mixtures of the RF cochannel signals.

4. The method of claim 1 further comprising:

determining the RF mixture weights ($m_{approx}$) through a procedure represented by:

$$m_{approx} = \arg \max_m \frac{m^T \left( \sum_{m \in p} R_m^T R_m \right) m}{m^T \left( \sum_{l \in s} R_l^T R_l \right) m},$$

where $$R_i \begin{bmatrix} h_{1i} \cos(\rho_{1i}) & \wedge & h_{Pi} \cos(\rho_{Pi}) \\ h_{1i} \sin(\rho_{1i}) & \wedge & h_{Pi} \sin(\rho_{Pi}) \end{bmatrix}.$$

5. The method of claim 1 wherein searching over appropriate degrees of freedom in the mixture manifold to establish a best fit between the formed data cumulants and the possible data cumulants includes establishing an optimal mixture matrix ($A_{est}$), where $$A_{est} = \operatorname*{argmax}_{A \in \mathcal{A}} \sum_{q=1}^{Q} w_q \frac{(c_y^q)^T P_A^q c_y^q}{(c_y^q)^T c_y^q},$$

where $\mathcal{A}$ is the mixture manifold representing the set of possible data cumulants, $c_y^q$ represents the formed data cumulants, with q representing a particular data cumulant, $P^{Aq}$ represents a matrix that projects onto the subspace spanned by $\Theta^q A$, where $P_A^q = (\Theta^q A)\{(\Theta^q A)^T (\Theta^q A)\}^+ (\Theta^q A)^T$, and $w_q$ are nonnegative weights.

6. The method of claim 1 wherein sequentially forming mixtures of the received RF cochannel signals using RF mixture weights includes using analog multiplication and summing of the RF mixture weights prior to single channel downconversion and sampling.

7. The method of claim 1 wherein forming data cumulants based on the baseband mixtures includes calculating moments mathematically related to the data cumulants.

8. The method of claim 1 wherein the array has a response r($\psi$,$\theta$) that is completely known and is not required to be steering direction ($\psi$) invariant, and the mixture manifold is parameterized by N angles of arrival ($\theta_n$), and searching over the $\theta_n$ enables a best fit between formed data cumulants to possible data cumulants, where N is the number of received multiple simultaneous RF cochannel signals.

9. The method of claim 1 wherein the array has a response r($\psi$,$\theta$) that is completely known and steering direction invariant, and in addition to N−1 AOA differences, the mixture manifold is parameterized by M parameters r($\psi_1$, $\theta_1$),K,r($\psi_M$,$\theta_1$), with an additional constraint that estimated mixture matrix columns be unit-norm, and wherein searching over the resulting N+M−2 degrees of freedom is performed to optimize the estimated mixture matrix, thereby enabling a best fit between formed data cumulants to possible data cumulants, where N represents the number of received multiple simultaneous RF cochannel signals, and M represents the number of formed RF mixtures.

10. The method of claim 1 wherein forming data cumulants based on the baseband mixtures allowing for modeling errors and finite sample effects.

11. The method of claim 1 wherein searching over appropriate degrees of freedom in a mixture manifold includes limiting the search region.

12. The method of claim 1 wherein previous angle of arrival estimates are used to initialize a next search, thus saving computational cost in the searching.

13. The method of claim 12 wherein the search range is reduced by only allowing the searching to be performed within a small angular window of last estimated positions.

14. The method of claim 1 wherein searching over appropriate degrees of freedom in a mixture manifold includes an alternating least squares (ALS) iterative optimization process.

15. The method of claim 1 further comprising:

determining source cumulants ($c_x^q$) thereby enabling source type identification for each received RF cochannel signal.

16. The method of claim 15 wherein determining the source cumulants includes using either ordinary least squares (OLS) or total least squares (TLS).

17. The method of claim 15 further comprising:

determining the number (N) of received RF cochannel signals based on estimated power of a weakest signal relative to the other signals.

18. The method of claim 1 wherein forming a downconverted baseband mixture for each RF mixture using single channel downconversion is carried out for a quadrature downconversion path.

19. The method of claim 1 wherein forming a downconverted baseband mixture for each RF mixture using single channel downconversion is carried out for a real downconversion path.

20. A method for determining the angles of arrival of multiple simultaneous cochannel signals received at a P-element antenna array, the method comprising:

receiving multiple simultaneous cochannel signals at the array;

sequentially forming mixtures of the received cochannel signals using mixture weights, thereby enabling non-simultaneously sampled mixtures;

forming data cumulants based on the formed mixtures; and searching over appropriate degrees of freedom in a mixture manifold including a set of possible data cumulants associated with the array to establish a best fit between the formed data cumulants and the possible data cumulants, thereby determining angle of arrival (AOA) estimates for each of the received cochannel signals.

21. The method of claim 20 wherein searching over appropriate degrees of freedom in a mixture manifold includes limiting the search region.

22. The method of claim 20 wherein previous angle of arrival estimates are used to initialize a next search, thus saving computational cost in the searching.

23. The method of claim 22 wherein the search range is reduced by only allowing the searching to be performed within a small angular window of last estimated positions.

24. The method of claim 20 wherein searching over appropriate degrees of freedom in a mixture manifold includes an alternating least squares (ALS) iterative optimization process.

25. The method of claim 20 wherein searching over appropriate degrees of freedom in a mixture manifold includes a general purpose optimization process.

26. A system for determining the angles of arrival of multiple simultaneous cochannel signals received at a P-element receiver array, the system comprising:

two or more elements adapted to receive multiple simultaneous cochannel signals;

a mixture forming section adapted to sequentially form mixtures of the received cochannel signals using mixture weights, thereby enabling nonsimultaneously sampled mixtures;

a form cumulants module adapted to form data cumulants based on the formed mixtures; and a subspace fitting search module adapted to search over appropriate degrees of freedom in a mixture manifold including a set of possible data cumulants associated with the array to establish a best fit between the formed data cumulants and the possible data cumulants, thereby determining angle of arrival (AOA) estimates for each of the received cochannel signals.

* * * * *

UNITED STATES PATENT AND TRADEMARK OFFICE
CERTIFICATE OF CORRECTION

PATENT NO. : 7,126,533 B2
APPLICATION NO. : 10/497556
DATED : October 24, 2006
INVENTOR(S) : Paul D. Flore and Steven F. Kimball It is certified that error appears in the above-identified patent and that said Letters Patent is hereby corrected as shown below:

Column 2,
Line 11, delete "Next", insert --Note--

Line 65, delete "$P^{Aq}$", insert -- $P_A^q$ --

Column 5,
Line 10, insert --sample-- after word "discrete"

Line 54, delete "$c_{y,m}^q$", insert -- $c_{y,m}^q$ --

Line 56, delete " $\mathbf{c}_y^q = \left[ c_{y,1}^q, \ldots, c_{y,M}^q \right]^T$ ", insert -- $\mathbf{c}_y^q = \left[ c_{y,1}^q, \ldots, c_{y,M}^q \right]^T$ --

Column 7,
Line 53, delete "$0 \leq \theta_1 < \ldots < \theta_N < 2\pi$", insert -- $0 \leq \theta_1 < \ldots < \theta_N < 2\pi$ --

Column 9,
Line 55, delete "
$$y(t) = \sum_{n=1}^{N} \sum_{p=1}^{P} m_p h_{pn} e^{j\rho_{pn}} x_n(t)$$
$$= \mathbf{a}^H \mathbf{x}(t),$$
", insert --
$$y(t) = \sum_{n=1}^{N} \sum_{p=1}^{P} m_p h_{pn} e^{j\rho_{pn}} x_n(t)$$
$$= \mathbf{a}^H \mathbf{x}(t),$$
--

UNITED STATES PATENT AND TRADEMARK OFFICE
CERTIFICATE OF CORRECTION

PATENT NO. : 7,126,533 B2
APPLICATION NO. : 10/497556
DATED : October 24, 2006
INVENTOR(S) : Paul D. Flore and Steven F. Kimball It is certified that error appears in the above-identified patent and that said Letters Patent is hereby corrected as shown below:

Column 11,

Line 5, delete "$\mathbf{m}_{approx} = \arg\max_{\mathbf{m}} \frac{\mathbf{m}^T \left(\sum_{m \in \mathcal{P}} \mathbf{R}_m^T \mathbf{R}_m\right) \mathbf{m}}{\mathbf{m}^T \left(\sum_{l \in \mathcal{S}} \mathbf{R}_l^T \mathbf{R}_l\right) \mathbf{m}}$", insert -- $\mathbf{m}_{approx} = \arg\max_{\mathbf{m}} \frac{\mathbf{m}^T \left(\sum_{m \in \mathcal{P}} \mathbf{R}_m^T \mathbf{R}_m\right) \mathbf{m}}{\mathbf{m}^T \left(\sum_{l \in \mathcal{S}} \mathbf{R}_l^T \mathbf{R}_l\right) \mathbf{m}}$ --

Line 38, delete "$c_{y,m}{}^q$", insert -- $c^q_{y,m}$ --

Line 40, deleete "$\mathbf{c}_y{}^q = \left[c_{y,1}{}^q, \ldots, c_{y,M}{}^q\right]^T$", insert -- $\mathbf{c}^q_y = \left[c^q_{y,1}, \ldots, c^q_{y,M}\right]^T$ --

Column 12,

Line 60, delete "$\mathbf{m}_{approx} = \arg\max_{\mathbf{m}} \frac{\mathbf{m}^T \left(\sum_{m \in \mathcal{P}} \mathbf{R}_m^T \mathbf{R}_m\right) \mathbf{m}}{\mathbf{m}^T \left(\sum_{l \in \mathcal{S}} \mathbf{R}_l^T \mathbf{R}_l\right) \mathbf{m}}$", insert -- $\mathbf{m}_{approx} = \arg\max_{\mathbf{m}} \frac{\mathbf{m}^T \left(\sum_{m \in \mathcal{P}} \mathbf{R}_m^T \mathbf{R}_m\right) \mathbf{m}}{\mathbf{m}^T \left(\sum_{l \in \mathcal{S}} \mathbf{R}_l^T \mathbf{R}_l\right) \mathbf{m}}$ --

UNITED STATES PATENT AND TRADEMARK OFFICE
CERTIFICATE OF CORRECTION

PATENT NO. : 7,126,533 B2
APPLICATION NO. : 10/497556
DATED : October 24, 2006
INVENTOR(S) : Paul D. Flore and Steven F. Kimball It is certified that error appears in the above-identified patent and that said Letters Patent is hereby corrected as shown below:

Column 15,

Claim 4, Line 10 delete "$\mathbf{m}_{approx} = \arg\max_{\mathbf{m}} \dfrac{\mathbf{m}^T\left(\sum_{m\in\mathcal{P}}\mathbf{R}_m^T\mathbf{R}_m\right)\mathbf{m}}{\mathbf{m}^T\left(\sum_{l\in\mathcal{S}}\mathbf{R}_l^T\mathbf{R}_l\right)\mathbf{m}}$", insert -- $\mathbf{m}_{approx} = \arg\max_{\mathbf{m}} \dfrac{\mathbf{m}^T\left(\sum_{m\in\mathcal{P}}\mathbf{R}_m^T\mathbf{R}_m\right)\mathbf{m}}{\mathbf{m}^T\left(\sum_{l\in\mathcal{S}}\mathbf{R}_l^T\mathbf{R}_l\right)\mathbf{m}}$ --

Claim 4, Line 20, delete "$\mathbf{R}_i = \begin{bmatrix} h_{1i}\cos(\rho_{1i}) & A & h_{Pi}\cos(\rho_{Pi}) \\ h_{1i}\sin(\rho_{1i}) & A & h_{Pi}\sin(\rho_{Pi}) \end{bmatrix}$", insert -- $\mathbf{R}_i = \begin{bmatrix} h_{1i}\cos(\rho_{1i}) & \cdots & h_{Pi}\cos(\rho_{Pi}) \\ h_{1i}\sin(\rho_{1i}) & \cdots & h_{Pi}\sin(\rho_{Pi}) \end{bmatrix}$ --

Claim 5, Line 39, delete "$P^{Aq}$", insert -- $\mathbf{P}_A^q$ --

Claim 9, Line 59, delete "known", insert --unknown--
Claim 9, Line 62, delete "K", insert --. . .--

UNITED STATES PATENT AND TRADEMARK OFFICE
CERTIFICATE OF CORRECTION

PATENT NO. : 7,126,533 B2
APPLICATION NO. : 10/497556
DATED : October 24, 2006
INVENTOR(S) : Paul D. Flore and Steven F. Kimball It is certified that error appears in the above-identified patent and that said Letters Patent is hereby corrected as shown below:

Column 16,
Claim 10, Line 4, insert --includes-- after word "mixtures"
Claim 20, Line 40, delete "antenna", insert --receiver--

Signed and Sealed this

Seventeenth Day of March, 2009

JOHN DOLL
*Acting Director of the United States Patent and Trademark Office*